United States Patent [19]

Kobosh

[11] 4,113,058
[45] Sep. 12, 1978

[54] PORTABLE SEAT FOR HUNTERS

[76] Inventor: Harry J. Kobosh, 12890 - 25 Mile Rd., Utica, Mich. 48087

[21] Appl. No.: 564,744

[22] Filed: Apr. 3, 1975

[51] Int. Cl.² ............................................. E04G 3/00
[52] U.S. Cl. ................................... 182/187; 108/135; 108/152
[58] Field of Search ............... 108/134, 135, 152; 182/187, 188; 248/221 R, 221 A, 221 E, 222 F; 297/217; 224/5 R, 5 A, 26 D, 26 J; 24/32 T, 32

[56] References Cited

U.S. PATENT DOCUMENTS

| 1,625,920 | 4/1927 | Thurman | 224/26 J |
|---|---|---|---|
| 1,984,602 | 12/1934 | Snyder | 108/134 X |
| 3,062,580 | 11/1962 | Jasmin | 297/4 |
| 3,392,802 | 7/1968 | Moore | 182/187 |

*Primary Examiner*—James C. Mitchell
*Attorney, Agent, or Firm*—Whittemore, Hulbert & Belknap

[57] ABSTRACT

A portable seat for hunters consisting of a vertical body to be placed on a tree trunk and held at the desired height by a chain having one end attached to one side of the body so that the other end may be wrapped around the tree and then removably attached to the other side of the body. A seat is hinged to the top of the body so that it can be folded into a closed position forming a flat package with all parts contained therein. When the seat is swung into open position it extends outwardly from the body into a horizontal position. A rigid non-extensible member is hinged to the underside of the seat so that it can be moved into a diagonal position with its free end engaging an abutment on the vertical body to form a strut or brace for the seat. The length of the brace and the location of the hinge are selected so that the brace is wholly within the package when the seat is moved to closed position and a spring bias is provided to keep the free end of the brace always in contact with the body. Means is provided on the back of the body forming clips for fastening to a belt.

7 Claims, 8 Drawing Figures

U.S. Patent  Sept. 12, 1978  Sheet 1 of 2  4,113,058
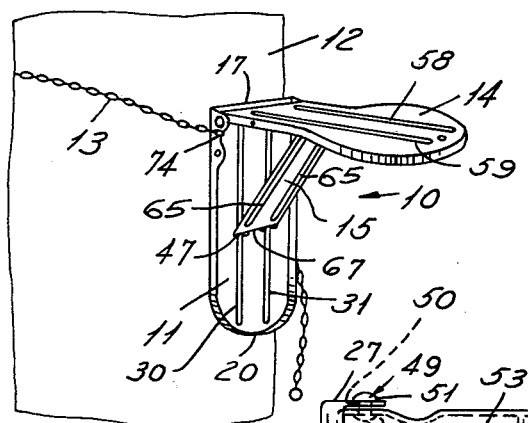
FIG. 1
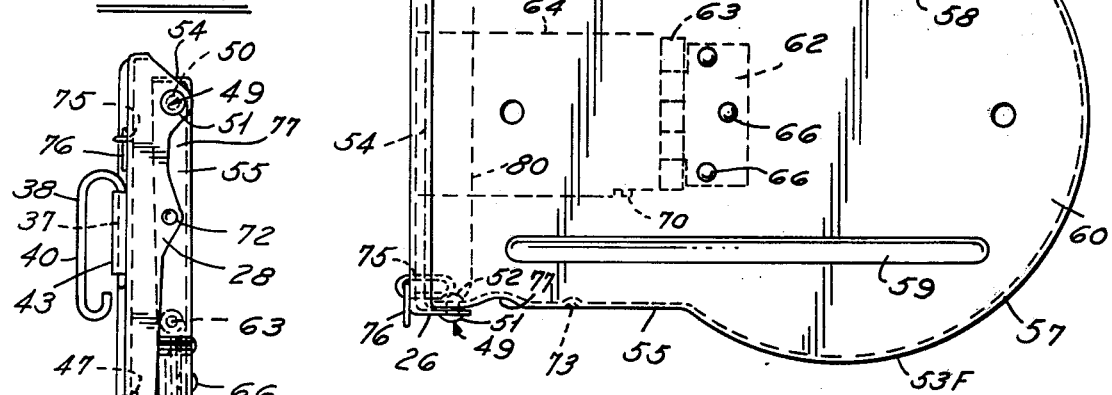
FIG. 2
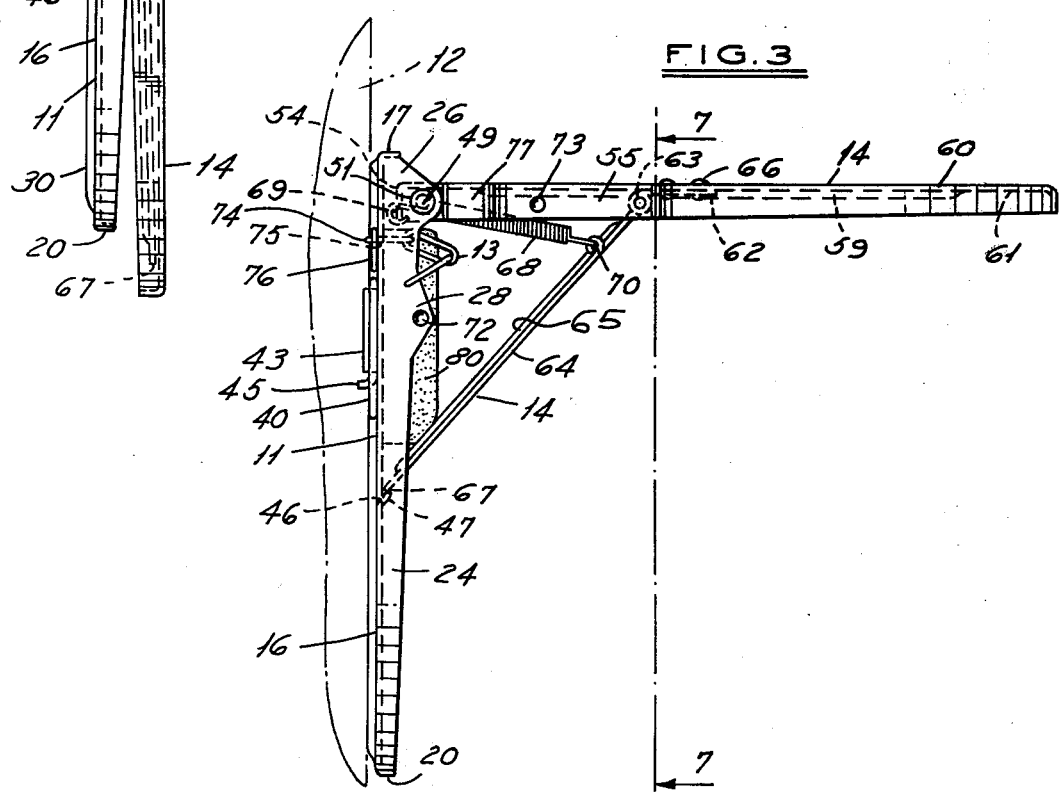
FIG. 4
FIG. 3

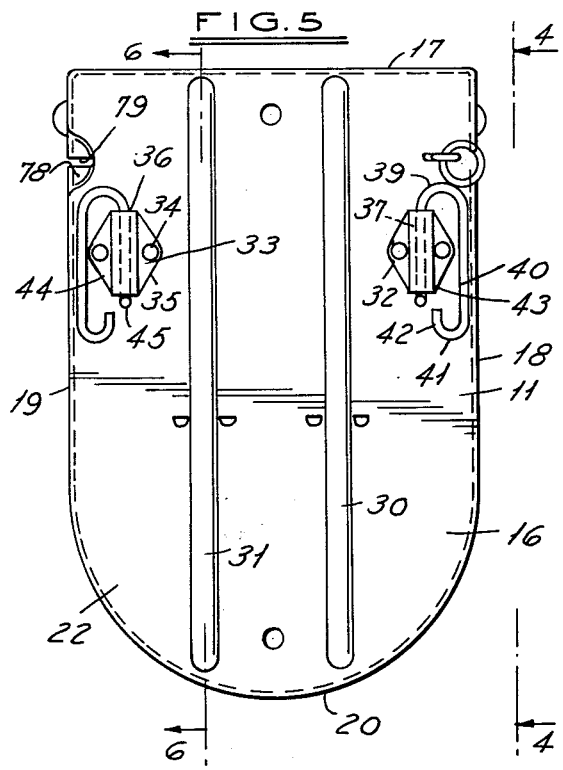
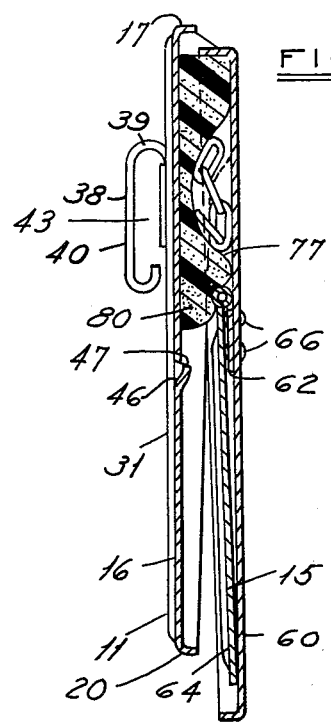
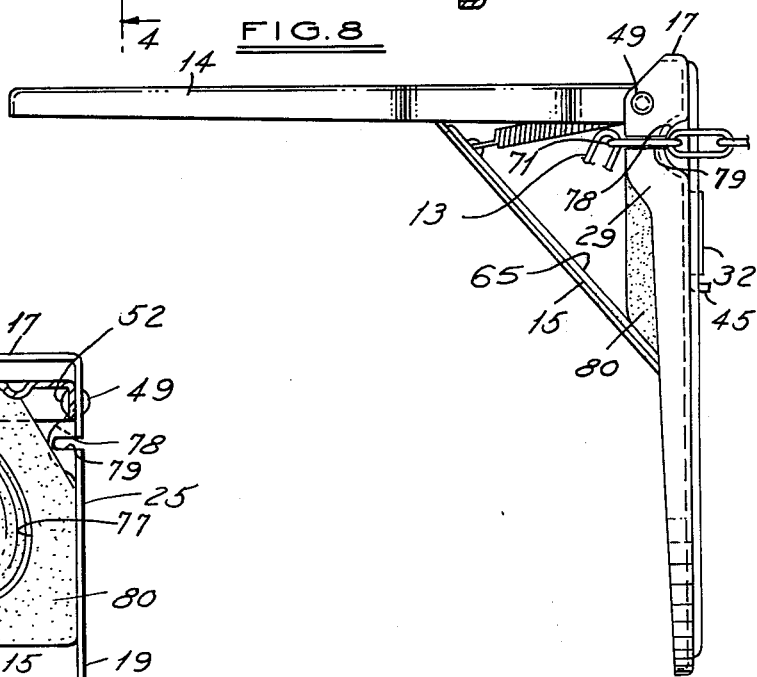
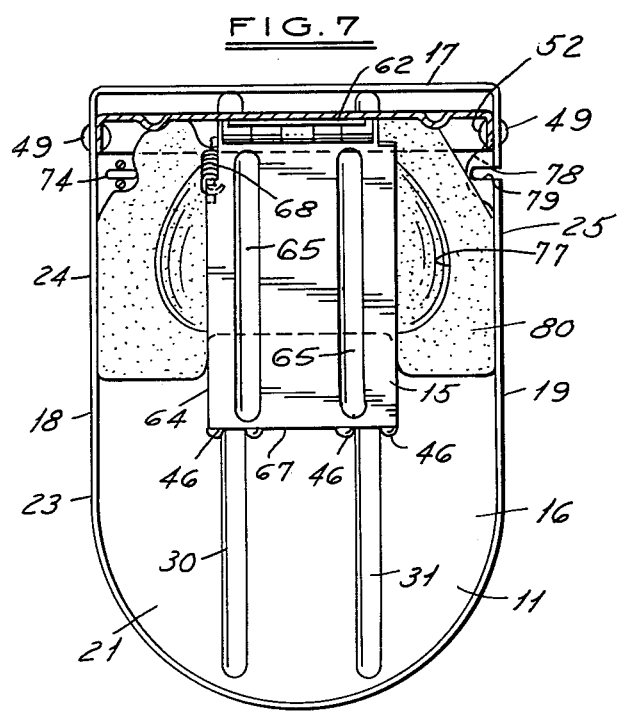

PORTABLE SEAT FOR HUNTERS

BACKGROUND OF THE INVENTION

The invention relates to a portable seat for hunters, campers or others for use in wooded locations.

In the present state of the art there have been many portable seat constructions designed for hunters with the same general purposes in view as those which have prompted the design and reduction to practice of the present invention. Even though some prior inventors have disclosed hunter's seats having some of these general objectives, the present invention has provided many improvements resulting in a superior construction which is patentably novel over all known prior art.

As representative of the state of the art, the following U.S. Pat. Nos. are cited in the order of their patent dates: 882,850, Troell, Mar. 24, 1908; 1,206,574, Miller, Nov. 28, 1916; 2,512,174, Roeder, June 20, 1950; 2,851,085, Woodward, Sept. 9, 1958; 2,855,980, Konieczka, Oct. 14, 1958; 3,115,213, Cloutier, Dec. 24, 1963.

SUMMARY OF THE INVENTION

The present invention relates to a portable seat for hunters that can be quickly erected in the woods and will provide a comfortable, dry resting place where none is otherwise available. The device has been designed to be conveniently transported, and readily unfolded into a usable form that can easily and quickly be mounted on a tree or other vertical support of generally similar configuration. It is readily dismantled and folded into a small, light weight package that can be easily carried by the hunter without interfering with the other gear which a hunter normally carries with him on his expedition into the hunting grounds.

When the device is in its transportable form, it is a complete, self-contained, compact, noise-free and light weight package that will fit in most pockets of a hunter's jacket or other clothing and it is also designed to be carried outside of clothing pockets by attaching to the hunter's belt.

In folded position, it is also constructed in such a way that the chain which serves to support the seat on the tree in normal use, can be withdrawn from the package and used as a tow with the remainder of the package constituting a hand grip for the tow chain. To aid in this auxiliary use, the chain has an O-ring on the free end to permit formation of a snare to grip the game or other object to be towed.

The device is provided with two special belt clips which can be swiveled out from the normal location in the compact assembly to a position for convenient attachment to the hunter's belt.

When folded into its compact carrying form, the device is noise-free because of the provision of a cushion to prevent the chain from rattling by loose contact with other metal parts.

DESCRIPTION OF THE DRAWINGS

FIG. 1 is a perspective view of the seat in open position mounted on a tree ready for use.

FIG. 2 is a top plan view of the horizontal seat top.

FIG. 3 is a side elevation looking from the left of FIG. 1.

FIG. 4 is a side elevation from the left of FIG. 1, showing the device in folded position with the belt clips ready for use.

FIG. 5 is a rear elevational view of the folded device looking toward the vertical body member with the belt clips folded against the rear face.

FIG. 6 is a view similar to FIG. 4 but shown in vertical longitudinal section on a line 6—6 of FIG. 5.

FIG. 7 is a sectional elevation on the line 7—7 of FIG. 3 looking toward the inside face of the vertical body member.

FIG. 8 is a side elevation looking from the right of FIG. 1.

DETAILED DESCRIPTION OF PREFERRED EMBODIMENT

As illustrated in FIG. 1, the device 10 comprises a main body 11 mounted vertically on a tree trunk 12 and firmly held thereto by a chain 13 wrapped around the tree trunk and secured to the upper corners of the body. A seat member 14 is adapted to be positioned at right angles to the body and held firmly in that position by the diagonal strut or brace 15. For convenience, the seat 14 will be referred to as the horizontal member and the body 11 as the vertical member of the assembly 10 because they have that relationship when mounted for use although when the parts are folded into carrying position the terms vertical and horizontal do not specifically apply. Therefore the use of such terms is not to be regarded as limitations except in the sense of the preferred ultimate use of the structure.

Now referring more in detail to the specific construction of the illustrated embodiment of the invention, the main body 11, opposite faces of which are shown in FIGS. 5 and 7 respectively, is preferably formed of sheet metal in suitable dies to provide a generally flat sheet 16 with a straight top edge 17, parallel side edges 18 and 19 and a rounded bottom contour 20. The entire periphery of the sheet 16 is provided with a lateral flange 23 that extends inwardly from the inner face 21 leaving the outer face 22 of the sheet 16 flat at the edges. The parallel side portions 24 and 25 of the flange 23 have oppositely positioned top ears 26 and 27 and intermediate ears 28 and 29. The outer face 22 of the main body is provided with a pair of strengthening ribs 30 and 31 parallel to the side edges 18,19 and preferably extending for almost the entire distance between the top edge 17 and the rounded bottom 10. Near the opposite side edges 18 and 19 on the outer face 22 of body 11 are two brackets 32 and 33 formed of sheet metal and secured to the outer face 22 of the sheet 16 by rivets 34 extending through the sides 35 of the brackets. Intermediate the rivet-held sides of each bracket is the transversely struck out portion 36 rounded to form the hinge joint 44 for receiving the pin 37 of a belt clip 38. The clip is formed of a metal wire, one end of which constitutes the pin 37 for insertion through the hinge joint. The wire is return bent at 39, to form a straight portion 40 parallel to and spaced from the pin 37. The wire is again return bent at 41 so that the free end 42 extends parallel to the pin 37 and in alignment with the outer surface 43 of the hinge joint. In assembly, the pin 37 is inserted through the axial passage within the rounded struck-out portion 36 and the projecting extreme end is laterally bent at 45 to retain the belt clip from accidental disengagement from the main body 11. The clip is of a size to receive a standard belt worn by a hunter. The pin is snugly fitted in the hinge so that there is no rattle when the portion 40 of the clip is pressed into firm engagement with the body but the fit of the pin permits turning of the clip to project transversely of the outer face 22 when the closed package is to be attached to the hunter's belt. It will be noted that the bent end 45 extends in a plane at right angles to the plane of the clip forming a stop engaging the face 22 to hold the belt clip in belt receiving position or alternatively, permitting the clip to be folded flat against the outer face 22.

The body sheet 16 has four struck out lugs 46 projecting inwardly in the same direction as the flange 23, two on opposite sides of the depression formed by each of the ribs 30 and 31. The edges 47 of the lugs are in alignment and positioned to serve as stops to engage the bottom free edge 67 of the diagonal brace 15.

The seat member 14 of the device is pivotally connected to the main body 11 by pins 49 extending through apertures 50 in the ears 26 and 27. As shown each pin has an outer head 51 at one end and a riveted part 52 on the inner end. The seat 14 (FIG. 2) like the body 11 (Fig. 5) is formed of sheet metal in suitable dies to provide a generally flat sheet 53 with a straight top edge 54, and parallel side edges 55 and 56 extending for a short distance and then merging into a circular portion 57 forming the front end of the seat. The entire periphery of the sheet 53 is provided with a lateral flange 53F similar to the flange 23 of body sheet 16. The seat is made stronger and more rigid by a pair of longitudinal ribs 58 and 59 struck inwardly from the outer surface 60 of sheet 53. On the inner surface 61 of the seat is attached one leaf 62 of the hinge 63. The other leaf of the hinge is the diagonal brace 14, which consists of the sheet metal plate 64 with a pair of strengthening longitudinal ribs 65. The first leaf 62 is secured to the underside 61 of the seat by rivets 66. The free end of the plate 64 constituting the diagonal brace has a straight edge 67 adapted to engage the aligned edges 47 of the four lugs 46 on the vertical body sheet 16. To prevent accidental disengagement of the brace from the lugs, there is a coil spring 68 one end of which is hooked through the aperture 69 of the top edge 54 of the seat and the other end is hooked through the aperture 70 near the upper edge of plate 64.

As viewed from the top (FIG. 2) the side flanged edges 55 and 56 fit within the opposite top ears 26 and 27 to which they are pivotally connected and these edges continue in alignment therewith so that when the device is closed as in FIGS. 4 or 6, the left flange fits snugly within the ear 28 and is frictionally held in closed position by the dimple 72 on the inside of the ear engaging in a corresponding depression 73 on the left hand flange.

One end 74 of the chain 13 is inserted through a slot 75 in the left flange 24 of the body and is permanently held by a ring 76 engaging the end link of the chain. The chain can pass outwardly from the assembly even when closed because of the indented portion 77 of the left flange 24. The other end of the chain 13 after being wrapped around the tree 12 can be secured to the right hand ear 27 of the body 16 by passing through indentation 78 and into slot 79 which is of a size to permit passage of the edge only of a chain link. The chain can be pulled taut around the tree and the slack adjusted by insertion of the proper link into the right hand slot 79. The chain cannot be drawn back out of the slot 79 because the next crosswise link 71 catches on the inside of the right hand flange 25.

Within the assembly there is provided a foam cushion 80 adhesively secured to the inside of the sheet 16. The cushion is of such thickness that when the chain is placed thereon and the seat is moved to closed position, the chain is prevented from rattling. As shown in FIG. 7 the cushion 80 occupies the upper half of the space on the inside of the body member from the top to a part above the aligned lugs 46 and for the entire width between the flanges of sides 24 and 25. The thickness is greater than the height of flange 23 so that when the chain is placed inside and the package closed there will be no room to rattle but the two hinged parts can be completely closed.

One of the features of the invention is the provision of a rigid one-piece non-extensible diagonal brace for the seat which cannot be accidentally rendered inoperative while in use. Accordingly, the brace is preferably hinged to the underside of the seat in such a location that it swings toward the outer end of the seat when folded yet is completely within the peripheral flange of the seat. This requires a predetermined relationship between the location of the seat pin 49 and the brace hinge 63, the lugs 46, and the length of the brace plate 64. While the invention is not limited to any definite size, the following dimensions, in inches, are given by way of a preferred example:

The main body 11 shown in FIG. 5 is 8 × 5¼. The seat 14 shown in FIG. 2 has a length of 8¼, thereby extending slightly beyond the body in closed position as shown in FIG. 4. The outside distance between sides 55 or 56 is 5, and the circular part 57 has a diameter of 6¼. The distance from seat hinge to brace hinge is 2⅜. The edge of the brace is 5 from the hinge and the width of the brace is 2½. The total overall size of the closed package is 9 inches long by 6½ inches wide by 1¼ inches in total thickness. The weight when made of sheet steel of about 16 gauge is 2½ pounds. This of course can be lessened by the use of other metals such as aluminum or of some strong non-metallic material such as plastic, preferably reinforced.

The device as described above and illustrated in the drawings is a specific embodiment of the invention but it will be understood that many of the details can be varied without departing from invention idea. If a seat cushion is desired, it can be of suitable thickness for comfort and can be included with the package by providing an auxiliary case of a size to surround the folded assembly and held in place by a zipper or other fastening arrangement.

In use, the device is easily attached to a tree trunk or other vertical support. The package is opened by swinging the seat about the pivot until it is perpendicular to the body. As it swings the brace 15 moves with the seat until its lower edge moves past the lugs 46. The tension of the spring keeps the lower edge pressing against the inside face of the body, riding over the lugs and locked into position above the lugs, thus providing a rigid brace for the seat.

The chain is attached to the left side but the free end of the chain is wrapped around the tree and brought back into position to be inserted into the slot on the right side. The slack is taken up and the proper link is inserted edgewise in the slot 79 with the next crosswise link 71 abutting the inside of the right hand flange 25. In dismantling after use, the free end of the chain is disconnected from the body and the entire chain is placed on the cushion. The diagonal brace is lifted against the tension of the spring and the lower end slid over the lugs, into a flat position adjacent the inside of the body. The seat and body are then folded together, so that the two parts form the top and bottom of a thin closed box-like structure with all parts contained within the same.

From the above description it will be apparent that the device when collapsed is a small compact box-like structure that can be carried in the hand or attached to a belt or placed in a pocket of a hunter's jacket. It can be quickly opened and attached to a tree where it forms a rigid seat strong enough to support the weight of the hunter. It can then be collapsed again into a package for easy transportation or it can be used as a tow chain for any large game that may have been acquired during the hunting expedition.

What I claim as my invention is:

1. A collapsible seat device for attachment to a tree comprising a body member for engaging the tree trunk to extend vertically, a seat member of similar size hingedly connected at one end of said body member to form a thin package and adapted to open to extend horizontally, a brace hinged to the inside of one of said members, a stop on the inside of the other of said members for receiving the free end of said brace, said brace being of a fixed non-adjustable length less than the length of the closed package to be fully contained therein when closed, the hinged end being so located on said seat member that the seat is approximately horizontal when the brace engages said stop, and a link chain for wrapping around said tree trunk with the ends attached to said body member below said hinged connection with said seat member, said attachment being at the upper corners of said vertical body member, in which said brace is hinged to said seat member and the stop is on said body member, one of said upper corners of said vertical body member having a slot through which one end link of said chain projects, means for anchoring said projecting end to the trunk-engaging side of said body member while the remainder of the chain is carried within said closed thin package.

2. A seat according to claim 1 having a spring below said brace and the hinged edge of said seat member, and said vertical body member having at the other upper corner a slotted side flange for receiving a chain link from the free end of the chain after wrapping around the tree trunk.

3. A seat according to claim 2 in which said seat member and said body member are each a flat sheet with an inturned flange around the periphery thereof and each have a plurality of longitudinally extending ribs, and said vertical member having an indentation therein adjacent said slotted side flange forming a reinforced structure of enhanced strength to receive the thrust from said free end of the wrapped around chain.

4. A seat according to claim 1 in which the free end of said chain is adjustably attached by inserting an intermediate link edgewise in a narrow slot in the flange of said body member adjacent the seat hinge, and said free end is provided with an O-ring to facilitate its use as a tow chain.

5. A seat according to claim 1 in which said stop is formed by a series of inwardly projecting lugs formed on said body member midway of the longitudinal dimension of said body, and a cushion is provided between said lugs and the hinged end of said body, for receiving said chain and preventing rattling thereof when carried in the closed package.

6. A seat according to claim 2 in which the back of said body is provided with clips pivotally mounted to project outwardly to be fastened to the hunter's belt and alternatively to be moved to flatly engage the body sheet.

7. A seat according to claim 2 in which the body is provided with a pair of brackets each with a pin receiving socket, a pair of clips for attaching to a hunter's belt, each clip formed of wire having a straight portion forming a pivot pin for insertion in said socket, a return bent portion at one end of said pin forming a straight portion parallel to and spaced from said pivot pin, said straight portion return bent to form a retaining hook for the bottom of said belt to prevent accidental loss of the package, and a transversely bent portion at the other end of said pin for retaining said pin in said socket and also forming a stop to hold said clips perpendicular to said body member when used to receive the belt, but permitting said clip to be folded against said body member when not in use with the belt.

* * * * *